United States Patent [19]

Schwartzman

[11] 4,367,626
[45] Jan. 11, 1983

[54] TURBOCHARGER SYSTEMS

[76] Inventor: Everett H. Schwartzman, 2751 Toledo St., Torrance, Calif. 90503

[21] Appl. No.: 57,563

[22] Filed: Jul. 16, 1979

[51] Int. Cl.³ .................................... F02B 37/00
[52] U.S. Cl. ........................ 60/606; 417/183; 417/407
[58] Field of Search ............... 60/606; 417/159, 183, 417/407

[56] References Cited

U.S. PATENT DOCUMENTS

| | | | |
|---|---|---|---|
| 2,390,161 | 12/1945 | Mercier | 417/159 X |
| 3,044,683 | 7/1962 | Woollenweber | 60/606 X |
| 3,068,638 | 12/1962 | Birmann | 60/605 |
| 4,018,053 | 4/1977 | Rudert et al. | 60/606 |

FOREIGN PATENT DOCUMENTS

| | | | |
|---|---|---|---|
| 2232592 | 1/1974 | Fed. Rep. of Germany | 60/606 |
| 2751987 | 5/1979 | Fed. Rep. of Germany | 60/606 |
| 1012365 | 4/1952 | France | 60/606 |
| 2226559 | 11/1974 | France | 60/606 |
| 2284040 | 4/1976 | France | 60/606 |
| 421110 | 12/1934 | United Kingdom | 60/606 |
| 652048 | 4/1951 | United Kingdom | 60/606 |

*Primary Examiner*—Michael Koczo
*Attorney, Agent, or Firm*—Mario A. Martella

[57] ABSTRACT

A turbocharger system includes a compressor driven by a turbine and a mixing device so connected that a portion of the outlet of the compressor is mixed with a portion of the exhaust gas of the combustion engine and is used to power the turbine. In one form the mixing device is an ejector and in another form, the compressor, turbine and mixing device are a unitary structure. Also described is a turboejector and a system is which a heat exchanger is used to preheat the compressor air prior to admixture with the engine exhaust gas. Various forms and structures are described.

16 Claims, 13 Drawing Figures

FIG. 1

FIG. 1a
THE CENTRIFUGAL COMPRESSOR

TURBOCHARGER SYSTEMS

BACKGROUND OF THE INVENTION

The present invention relates to a turbocharger system for combustion engines for example, internal or external combustion engines such as an Ericsson engine, and more particularly to an improved turbocharger system including a compressor driven by a turbine from the exhaust gases and which produces supercharging over a broad range of engine operation, i.e. from idle to full power operation.

Present day turbochargers usually use a turbine driven by an engine exhaust gas, the turbine having a shaft connected to drive a compressor; the compressor operating to increase the pressure of incoming air. The turbocharger may be installed either to suck through a carburetor or to blow through the carburetor or may be used with fuel injection systems.

As is known, one of the problems with present day turbocharges using turbines and compressors is that at low flow range of engine exhaust gases, e.g. the idle mode, there is insufficient flow of exhaust gases to drive the turbine. Conversely, at full power mode, present day systems either provide an abundance of supercharging (with possible engine damage) or flow of exhaust gas to the turbine would be restricted, thus increasing the backpressure of the engine to unacceptable levels, unless suitable control device such as a dumping valve or "waste gate" is used. The present use of such devices results in a large loss of otherwise usable power.

Further, the compression ratio of the engine and the performance of the turbocharger system must be "matched" so to speak so that the turbocharger provides the desired supercharging in the range of engine operation for which it is desired. Presently, the turbocharger is usually designed so that the maximum beneficial effect of turbocharging is achieved at or near the engine's most efficient design range, or an engine is turbocharged to achieve a specific performance, e.g. high initial acceleration, high initial horsepower. In the case of pleasure vehicles, the turbocharger and engine are matched to provide optimum performance in the usual cruising range of the vehicle.

For example, at idle an engine is not at its most efficient operation and the volume of exhaust gases is low in comparison to cruising speed or full power.

Since the boost pressure of the turbocharger increases approximately as the square of the speed of the compressor, the usual practice is to control the speed of the turbine in order to control the speed of the compressor. In this way the proper boost pressure is obtained in that desired range of engine operation. Due to the variation in exhaust gas flow of the engine from the idle to full power operation, it has theretofore been difficult to obtain efficient turbocharger-engine performance over the range of engine operation from idle to full power.

More specifically the performance (speed) of a turbine of a fixed size and geometry is related to the pressure and flow of the inlet fluid. As the pressure and flow increase, the turbine speed (and thus the compressor speed) increases. Moreover, it is known that in the case of turbomachinery, there is a range of optimum performance.

Accordingly, the problem with prior turbocharger systems has been the fact that optimum operation is over a limited range, e.g. fast acceleration, brief bursts of power or cruising range, the reason is that usually the turbocharger system includes some form of a "waste gate" system in the gas flow path from the engine exhaust to the turbine. At the idle condition of the engine, the waste gate is closed and all of the engine exhaust, or a substantial portion, enters the turbine, the flow being at a reduced volume compared to acceleration or cruising mode of engine operation. There is normally very little, if any, supercharging effect, unless the system is designed specifically to operate in the idle through a portion of acceleration range of engine operation.

As the engine accelerates, more exhaust gases at a higher pressure flow into the turbine, causing it to increase in speed and causing the compressor speed to increase, resulting in an increase in boost pressure. Once a steady state condition in reached in which the turbocharger and engine performance are matched, the system operates at its design efficiency. If, however, engine speed is increased further, the excess exhaust gases are dumped through the waste gate in order to assure that the turbomachinery continues to operate at or near its design efficiency, and to prevent an increase in the back-pressure.

The result is that on each side of the design condition, fuel economy is reduced over that at the design condition. The only saving in fuel (or increase in power) is in that range in which the engine and turbocharger are running at their matched design ranges, usually a cruising range for most engines and vehicles.

It is also well-known in the art of turbomachinery that given a turbine or compressor of given design and geometry, the maximum efficiency is over a rather select range of impeller speed, flow, and pressure condition. Thus, from a practical standpoint, it is difficult to provide a turbocharger system which is effective over a range of engine performance because of the variation in the needs of the engine and the available energy to drive the turbine.

DESCRIPTION OF THE PRIOR ART

Turbochargers with "waste gate" controls are well-known. Various forms of additions have been made to turbocharger systems, for example, an ejector for assuring a pressure drop across the turbine, see U.S. Pat. No. 2,903,847 of Sept. 15, 1959.

U.S. Pat. No. 3,044,683 of Jan. 18, 1960 describes a control which limits the pressure of air delivered to the engine.

U.S. Pat. No. 3,102,381 of Aug. 4, 1961 describes a metering device in the form of a positive displaced compressor, or blower for controlling the weight of air that flows to the engine.

U.S. Pat. No. 3,103,780 of Sept. 7, 1963 describes a system in which a heat exchanger receives the exhaust from the turbine, and in which a portion of the output from the compressor is heated in the heat exchanger and then passed into the turbine.

U.S. Pat. No. 3,633,358 of Jan. 11, 1972 describes a system in which supercharged air is mixed with engine exhaust products for supercharging.

The above described systems, as well as other prior art systems, operate well but do not offer the advantages of the system of the present invention.

Thus, it is an object of the present invention to provide an improved turbocharger system which, over the optimum efficiency range of the system, produces a broad range of the flow to an engine from the idler to the full power requirements of the engine.

It is also an object of the present invention to provide a relatively simple turbocharger system capable of functioning at good efficiency over the entire range of operation of the engine.

SUMMARY OF THE INVENTION

These and other objects are achieved in accordance with the present invention by two main approaches as follows:

(1) A variable turbine nozzle design is used which is simpler and more effective than present designs, i.e. maintains constant inlet angle requirements, and expansion area requirements and also controls the bypass ratio.

(2) The compressor is sized to meet approximately the largest flow requirement at the desired pressure ratio and only requires the compressor to operate over the flow range of its maximum overall efficiencies.

The compressor is essentially always operated around its most efficient design point so determined by the required pressure ratio at the largest flow requirements. In order to match the I.C. engine flow requirements, the necessary flow to the I.C. engine is maintained by bypassing some of the compressor's flow around the I.C. engine. To ensure efficient operation of the given supercharging system, the compressor flow is efficiency mixed with the I.C. engine via a variable annular type ejector so as to provide sufficient fluid energy to power the compressor. One advantage of the given invention is that the system operates at high speeds over its required limited range thus providing almost instantaneous flow at the desired pressure level which will match the I.C. engine requirements. The salient feature of this invention is the turbo-ejector type mixing of the compressor bypass flow with the I.C. exhaust fluid to provide the power to drive the compressor. The slight inefficiencies are compensated by the above mentioned variable turbine inlet nozzle and the required limited change in turbo-compressor operating speed. This invention also allows for a cooler operating turbine due to the reduction in temperature of the turbine drive fluid which is composed of the bypassed compressor flow and I.C. engine exhaust gases. Another advantage of the system of the present invention is that since the turbo-compressor combination operates over a restricted range of optimum efficiencies, it is possible to use a vaned diffuser in the compressor. This is possible, in accordance with this invention, because the compressor operates over the range whereby the increase in compressor efficiency due to the use of a vaned diffuser can be utilized thus affording overall higher efficiencies than those systems presently used and which include vaneless diffusers.

The main control is provided by the unique type of variable turbine nozzle bypass control concept. This system is further "tuned" by the required necessary relatively small speed changes.

The most fundamental system can be analyzed whereby the compressor bypass is mixed with the I.C. exhaust in a variable type ejector and then diffused to static conditions; subsequently the final output of the ejector can then be utilized by the required turbine drive. This "fundamental system" is used for analytical purposes to compare with other anticipated systems which have the advantage of providing the necessary control via (A) variable turbine inlet nozzle, (B) variable bypass requirements plus the fact that the diffusion portion of the "standard" type ejector and its associated losses have been eliminated.

It should be noted that the "standard" type ejector mixing scheme can be replaced completely by a more efficient turbo-ejector prior to the use of the conventional type turbocharging system, as will be described.

A more sophisticated and efficient system is one that utilizes all of the above principles with the addition of regenerative heating between the bypass portion of the compressor output and the exhaust from the drive turbine. This scheme provides more useful energy to the turbine drive and thus the given system can be operated at much lower backpressure requirements, almost one half as much.

Other advantages, modes and uses will be readily understood by those skilled in the art after they have read the following detailed description and referred to the accompanying drawings which illustrate what are to be considered to be preferred forms of the present invention as set forth in the appended claims.

DESCRIPTION OF THE PREFERRED EMBODIMENT

Figure 1:
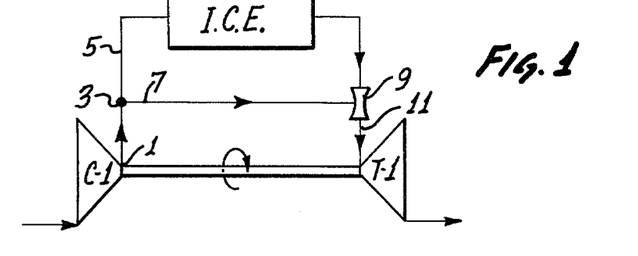
FIG. 1 is a schematic view of a typical turbocharger system is accordance with the present invention.

Referring to the drawings which illustrate preferred forms of various aspects of the present invention, FIG.

1 illustrates in schematic form a turbocharger system in accordance with this invention in which a compressor C-1 is powered by a turbine T-1.

Figures 1A, 2:
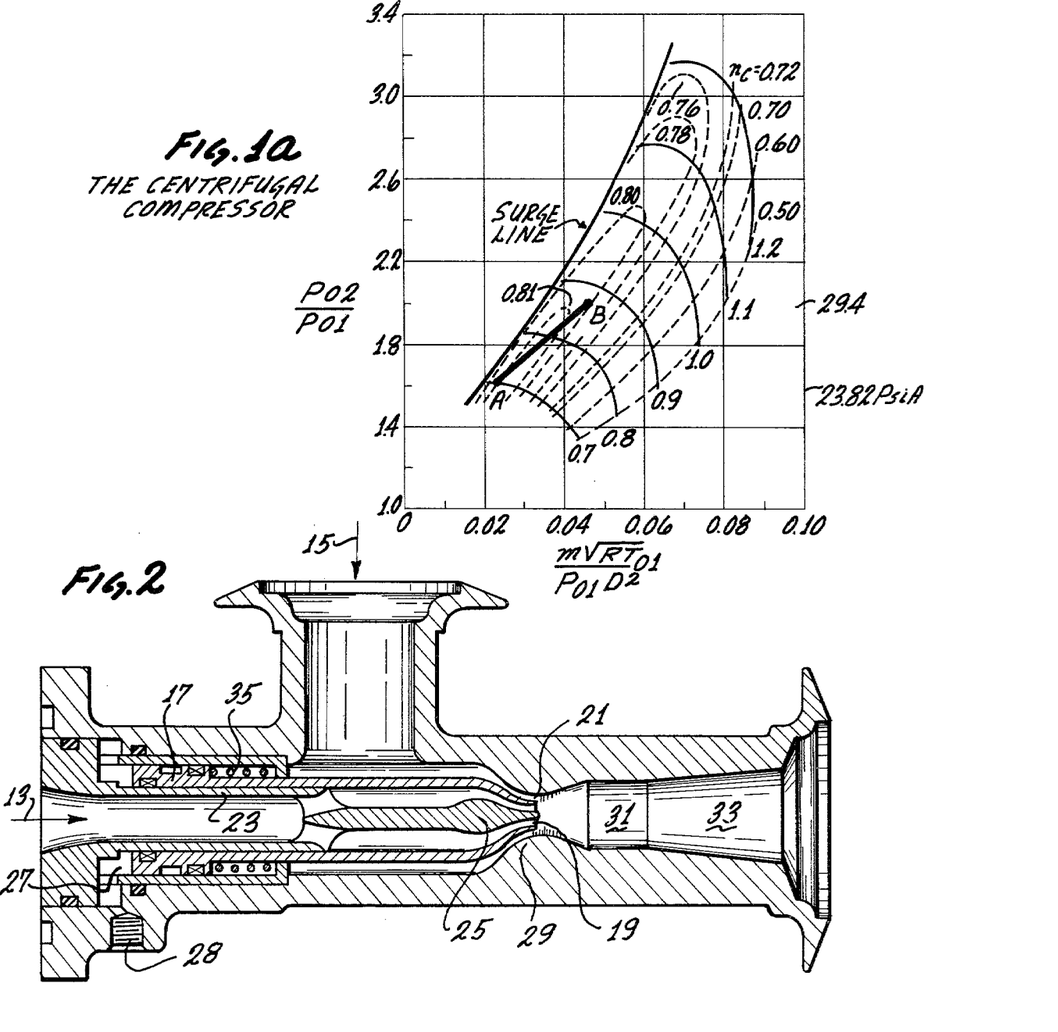
FIG. 1a is a typical compressor map from which various features of the present invention may be understood.
FIG. 2 is a view partly in section and partly in elevation of the ejector used in accordance with the present invention.

The flow from compressor C-1 is transported via pipe 1 to junction 3 where the Internal Combustion Engine's (I.C.E) required flow is ducted to the engine via pipe 5. The compressor is designed to operate over its maximum efficiency flow range. FIG. 1-$a$ is a typical compressor map representative of the performance as to be expected from compressor C-1. By way of example the compressor operates between points A and B on this curve. It can be seen that over this range there is a mass flow turn up ratio of approximately 2:1, while the overall compressor efficiency is at is maximum. However, the flow turn up ratio required by the I.C. engine from idle to full power is in the neighborhood of 5:1. Thus, for example, at full power the compressor would produce 5 units of flow and there would be zero units of flow through bypass pipe 7. At idle the engine would require only 1 unit of flow and at this requirement the compressor would produce 2.5 units of flow, i.e., $\frac{1}{2}$ of maximum compressor flow with a turn up ratio of 2. This is represented by point A on FIG. 1$a$ while full flow, that is 5 units, is represented by point B respectfully.

Therefore, one unit of mass flow is supplied to the I.C. engine via pipe 5 while 1.5 units of flow would be bypassed at junction 3 into pipe 7. The bypass flow and exhaust from the engine are efficiently combined in ejector 9, since the combined flow has sufficient energy to power the turbine T-1 which in turn drives the compressor C-1. This fluid is transported from said ejector 9 via pipe 11 to turbine T-1.

Since the energy levels of the bypassed fluid and engine exhaust are of approximately the same magnitude, a properly designed ejector 9 can efficiently mix said two fluids.

Referring to FIG. 2, one form of ejector 9 is shown in detail. As can be seen, the main feature of this ejector design is that it is a two fluid "double" variable area device. The compressor bypass flow enters the ejector at inlet 13 while the I.C. engine exhaust enters said ejector at inlet 15. A piston-nozzle 17 moveable from left to right serves as part of both a primary nozzle section 19 and a secondary nozzle section 21. Primary nozzle 19 is comprised of piston 17 in conjunction with a spindle 25 of the inlet tube. As the piston nozzle moves towards the left the throat area of primary nozzle 19 is decreased while the throat area of secondary nozzle is increased. This movement of piston 17 is controlled by the pressure admitted to a chamber 27 through inlet 28 and the optimum position is controlled and maintained as required by the power level at which the total system is required to operate. Known in the art, the respective primary (19) and secondary (21) nozzle's expansion ratio may be obtained by the correct shape of said parts 25 and 17 in conjunction with the shape of outer contour 29. Following the variable nozzle, a constant area mixing section 31 may be employed which subsequently is followed by the diffusing section 33. During a high power level requirement, the piston 17 is in the most "left" position thus decreasing the bypass flow and allowing almost all of the compressor output flow to go through the I.C. engine. During an idle engine requirement, the piston 17 is in the most "right" position thus allowing the necessary amount of compressor output flow to be bypassed, directly to the ejector mixing section 31. The controlled variable ejector concept makes it possible to efficiently combine the aforementioned streams so that a sufficiently high energy level fluid stream results which subsequently powers said turbine under all of the I.C. engine power requirements.

As previously mentioned this ejector is controlled by the amount of pressure maintained in chamber 27. If need be, piston 17 may be biased by spring 35 which in conjunction with the controlled pressure in chamber 27, ensures that the proper position of piston 17 can always be obtained and maintained by proper control of chamber 27 pressure. The pressure in chamber 27 may be obtained by suitably controlling said pressure with reference to the relevant parameters such as engine exhaust manifold pressure, engine R.P.M. and engine flow. Also turbo-compressor pressure, flow, and R.P.M. may also be monitored and utilized in conjunction with the just mentioned control parameters.

Figure 3:
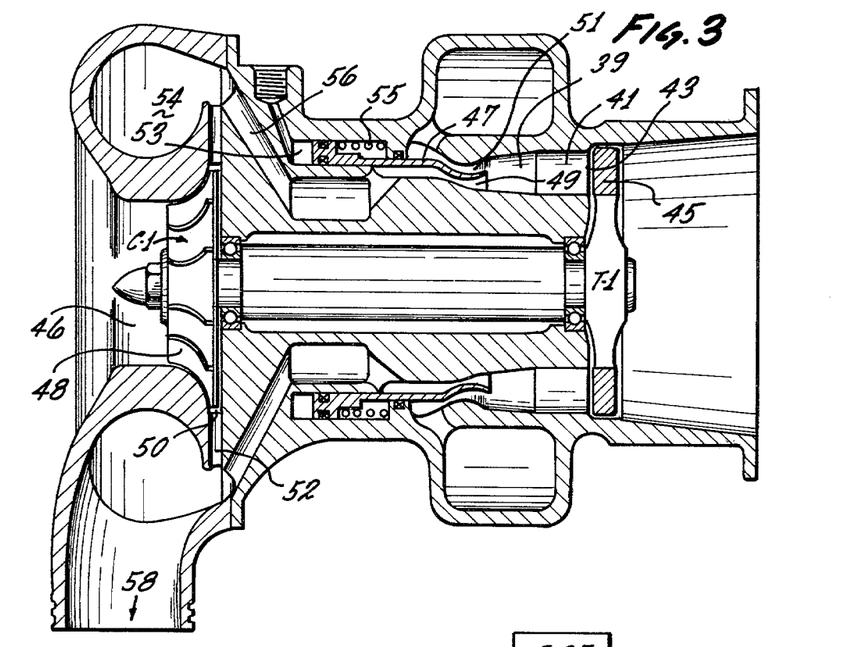
FIG. 3 is a view partly in section and partly in elevation which integrates the turbocharger system of FIG. 1 into a single equipment package in accordance with this invention.

Referring now to FIG. 3, a system is shown which employs the same concepts as depicted in FIG. 2 except that this illustration shows a complete annular design which intergrates the system as shown in FIG. 1 into a practical turbocharging package. Since, in accordance with the present invention; it is possible to operate the compressor over its optimum efficiency range while still providing the necessary flow and pressure to allow the entire system to operate over the engine's full range requirements, a vaned diffuser may be used to increase compressor efficiency.

As shown in FIG. 3, the ambient air enters the compressor intake at 46 and exits through the impeller 48 of compressor C-1, leaving the impeller at 50. A vaned diffuser 52 is used to reduce the velocity of the air and thus converts it kinetic energy into potential energy, i.e. lower velocity results in a higher pressure of the air, which is collected in a plenum 54 prior to discharge through external passages 56 or to the engine via outlet pipe 58. If desired, however, a plain annular (vaneless) diffuser may be used in place of the vaned diffuser 52.

As noted, in accordance with this invention, a portion of compressed air is mixed with the engine's exhaust gases prior to use of the mixture of drive the turbine T-1, and the total diffuser portion and its associated losses are reduced by proper design, as is known in the art, so that the static pressure is maintained at such a level that a large portion of the diffusing is eliminated. After the mixing section 39 only a small amount of diffusing is necessary which can take place either in diffuser section 41 or in the centering section of guide vanes, turbine nozzle, 43. Since the difference in velocities across the turbine blades 45 is what produces the power, the most practical approach is to just turn the high velocity fluid subsequent to its exit from the ejector, for proper entrance to the turbine blades 45. This turning is accomplished by turning vanes or turbine nozzle 43. In order to optimize the ejector design, in some circumstances it may be necessary to expand both the primary and secondary streams to a static pressure level lower than ambient. In this case a diffuser is employed, either as its own entity 41, or in a portion of the turbine nozzle 43, whereby the gas stream is diffused to the pressure level required to exhaust said fluid at ambient conditions.

In annular form, ejector nozzle 47 is movable so as to be able to vary both the primary and secondary nozzle area 49 and 51 respectively. This ejector nozzle 47 is controlled by varying the pressure in chamber 53 (corresponding to chamber 27) and said nozzle 47 is biased if needed by spring 55. The mode of operation in FIG.

3 is identical as that described above for FIG. 2. The exhausting gases from guide vanes 43 impinge on turbine blades 45 so as to drive said turbine for powering said compressor.

Figure 4:
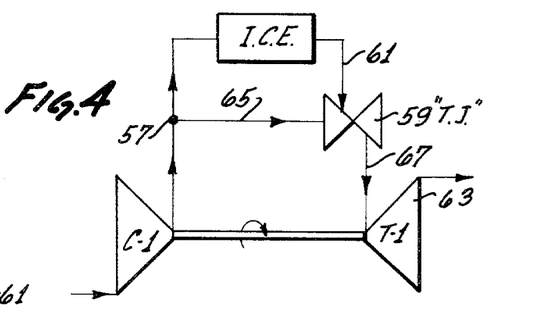
FIG. 4 is a view similar to FIG. 1 in which a turbo-ejector is used in accordance with this invention.

FIG. 4 employs the same thermodynamic concepts as shown in FIG. 1 except a diverter valve 57 is utilized in conjunction with a turboejector (TJ) 59. In this illustration, the diverter valve 57 is used to control the amount of compressor C-1 output flow required by the I.C. engine. Essentially said valve 57 is the bypass flow control. The bypassed fluid is transported via pipe 65 to TJ 59. The TJ 59 serves to combine the bypassed fluid via pipe 65 and I.C. engine exhaust transported to the TJ 59 via pipe 61 in a very efficient process so that the exhaust fluid from TJ 59 has a suffiently high energy level to drive turbine 63 which in turn powers compressor C-1. The exhaust fluid from TJ 59 is transported to said turbine 63 via pipe 67.

The operation of the TJ 59 is described with reference to the co-pending application Ser. No. 102,129 filed Dec. 10, 1979, now U.S. Pat. No. 4,303,377, which is a continuation of Ser. No. 875,115 filed Feb. 3, 1978, and now abandoned, which disclosure is incorporated herein by reference.

In FIG. 4 the engine exhaust fluid (via pipe 61) is utilized as the drive fluid in the TJ while the compressor bypass fluid (via pipe 65) is the driven fluid. In this scheme (FIG. 4) the amount of fluid bypassed is such that at the full power requirements of the I.C. engine a portion of the compressor output must always be bypassed in order to prevent the device from obtaining an excess speed. In other words, at full engine power requirements the bypass valve also serves as the speed control for the TJ by allowing enough flow to properly load the TJ device.

Figure 5:
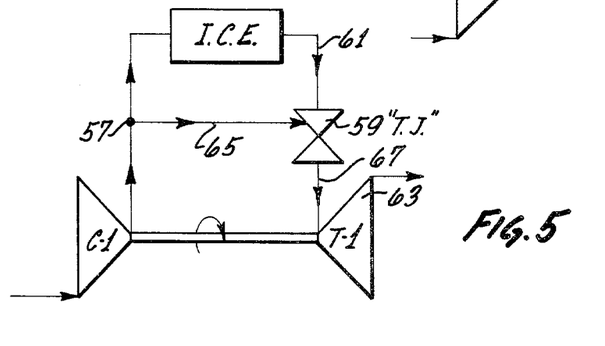
FIG. 5 is a view similar to FIG. 4 in which the compressor bypass fluid is the drive fluid in accordance with this invention.

FIG. 5 illustrates the use of the TJ device whereby the compressor C-1 bypass fluid is the drive fluid (transported to said TJ via pipe via pipe 65) while the I.C. engine's exhaust fluid (transported to TJ via pipe 61) is the driven fluid. In this configuration at the full power requirements of the I.C. engine only a very small portion of the compressor output is required, since in this mode of operation only enough drive fluid is necessary to produce enough rotational speed to prevent a pressure drop though the device, i.e. only a pressure ratio of 1 has to be maintained across the TJ. In the full power mode the combination turbo 63 and compressor C-1 act as the conventional type turbocharger.

In both FIGS. 4 and 5 the exhaust from the TJ device is utilized to drive turbine 63 and is transported to said turbine via pipe 67.

Figure 6:
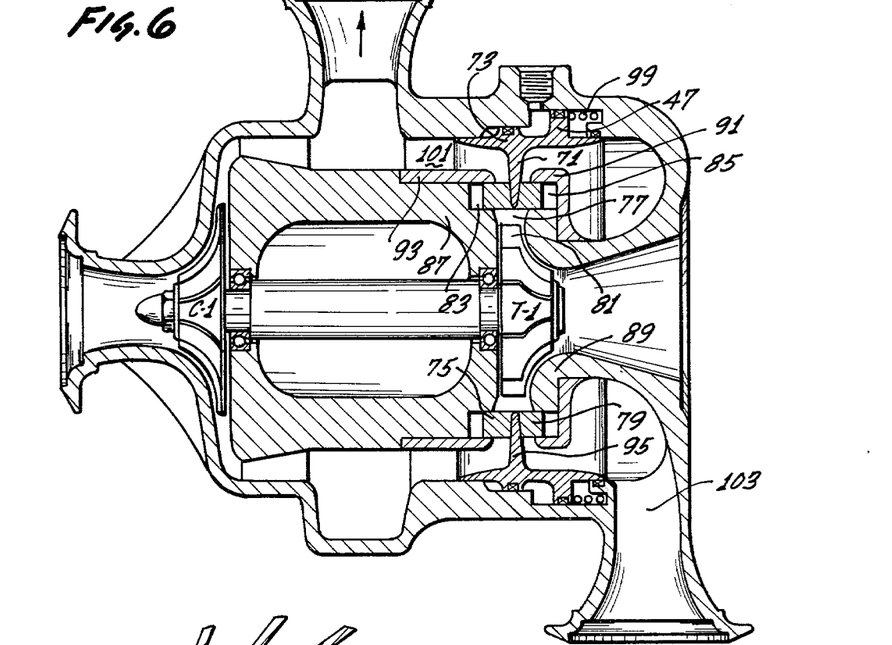
FIG. 6 is a view partly in section and partly in elevation which integrates the turbocharger system of FIG. 1 and which includes a variable control radial nozzle in accordance with this invention.

FIG. 6 illustrates the same thermodynamic and fluid flow concepts as explained for FIG. 1. In this embodiment the variable area or flow control is obtained by a combination variable area nozzle for both the compressor bypass flow and I.C. engine exhaust flow. This variable nozzle is comprised of the partition 71 which is attached to sliding member 73. Attached to said partition 71 are the turbine inlet flow nozzles 75 for directing the bypassed compressor flow to mixing region 77. Also attached to said partition 71, but on the opposite side are the turbine inlet flow nozzles 79 for directing the I.C. engine exhaust gases into mixing region 77. Subsequently to the mixing of said directed gases the resulting high velocity flow enters the turbine T-1 and by impinging on said turbine's blades 81 drives said turbine which powers compressor C-1.

Said nozzle inlet blading 75 and 79 move in a recessed region 83 and 85 respectively, which is made integral with housing 87 and 89 respectively. A shroud ring 91 is utilized to cover said recess so as to prevent any exhaust gas particles from depositing in said recess. Similarly, shroud cover 93 is used for both preventing deposits and to also maintain uniform flow prior to the fluid's entrance to said inlet nozzles. The complete variable double nozzle member 95 comprising of 73, 71, 75, and 79 is moved by actuating piston 97 and if necessary biased by spring 99. The compressor bypass flow is conducted into said nozzle region through passage 101 while the I.C. engine exhaust is conducted into said nozzle region via passage 103. As to be noted the axial movement of said nozzle arrangement allows for an increase in area through the bypass flow region 101 while decreasing the flow area through I.C. engine exhaust 103 region when the variable nozzle is in its "right" most position. Likewise, when said nozzle assembly is in the opposite position there is a decrease in area through the bypass flow region while an increase in flow area for the I.C. engine exhaust flow. Thus the desired area for controlling the necessary bypass flow is obtained by the position of said variable nozzle assembly 95. As shown in this figure said position is controlled by pressure level admitted to actuation piston 97 which is controlled in similar fashion as described for FIG. 2.

Figure 6A:
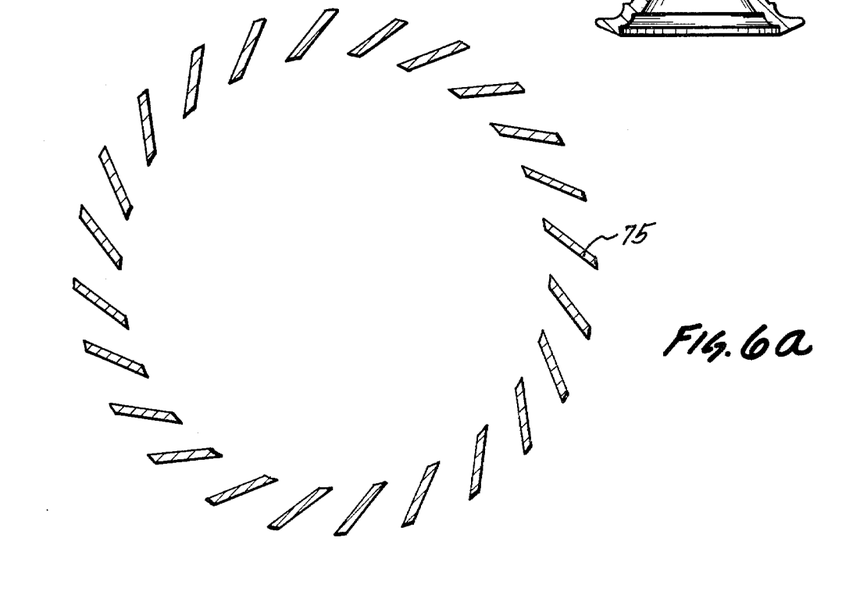
FIG. 6a is a diagrammatic view of a radial turbine inlet nozzle of the device of FIG. 6, in accordance with this invention.

FIG. 6a is a cross section through a typical radial turbine inlet nozzle 75 representing a typical end view. It is to be noted that a similar pattern 83 is utilized in housing 87 to accommodate said nozzle blading and thus provide for a recess in which said nozzle blading is free to move so that its desired position and thus bypass ratio may be obtained. Said required position or throat area ratio as between said bypass flow and I.C. engine exhaust flow is a function of the I.C. engine's power requirements and is obtained and maintained as previously explained.

Figure 7:
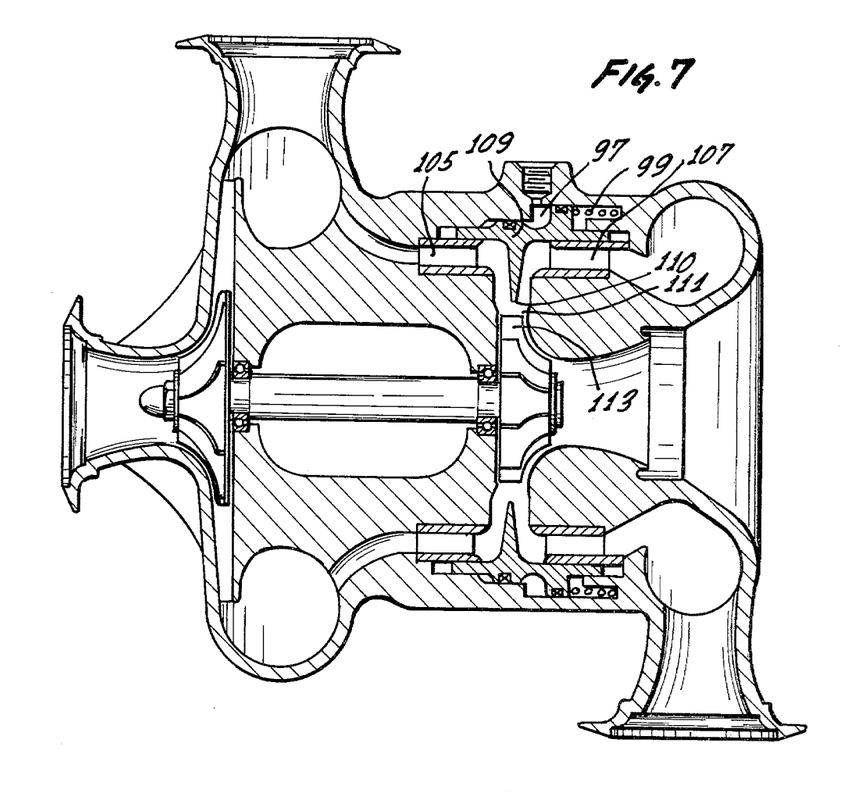
FIG. 7 is a view partly in section and partly in elevation of another form of variable bypass flow system employing axial nozzles in accordance with this invention.

FIG. 7 is an illustration that depicts another variable bypass flow arrangement that is similar to that as explained in FIG. 6. In this embodiment both the bypass flow and I.C. engine exhaust flow are given a tangential velocity component by guide vanes or nozzles 105 and 107 respectively. The smooth bypass plate 109 has the feature of moving axial so as to vary the effective area and thus control the required bypass flow ratio. It's axial movement is similarly controlled as previously explained and in this configuration the movable nozzle guide vanes have been replaced by said stationary vanes 105 and 107. This configuration prevents the possibility of contaminents from accumulating in the guide vane recesses, since these recesses have been eliminated. Following the fluid's exit at point 110, there is a mixing region 111 prior to the combined flow's entrance to turbine blades 113.

Figure 8:
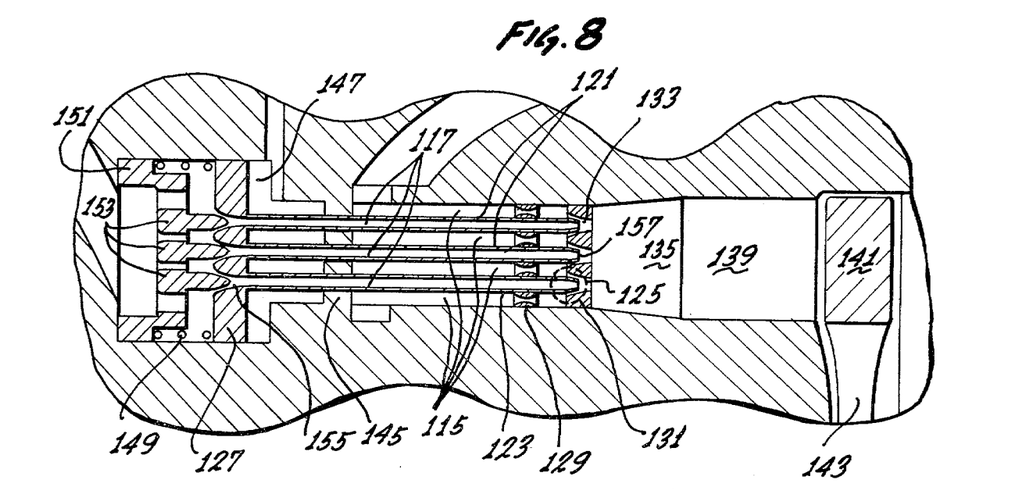
FIG. 8 is a view partly in section and partly in elevation of a form of ejector in which the hot exhaust gases preheat the bypass flow in accordance with this invention.

FIG. 8 is a schematic of another form of ejector in which the hot exhaust gases 115 preheat the bypass flow 117. In this configuration the bypass flow 117 flows through tubes 121 where it is heated by the hot exhaust gas 115 flowing around said tubes. This configuration allows for an overall more efficient ejector at the expense of the complexity of the added heat exchanger bundle 123 comprising of the tube bundle made up of said tubes 121. Since the I.C. engine's exhaust gases are hotter than the compressor C-1's output and the compressor output is usually of a higher pressure than the required backpressure of the I.C. engine's exhaust gases, a more efficient supercharging system (i.e. requiring lower I.C. engine back-pressure for the same compressor output pressure) may be obtained by heating the bypass flow with the exhaust gases prior to their expansion in the ejector nozzle 125. By reference to FIG. 8 the tube bundle 123 has end portions 127 and 129. The tubes 121 are permanently attached to said end portions. End portion 129 has holes through said member between said tubes 121 so as to allow the exhaust gas to pass. Said tube bundle comprising of tubes 121 and end portion 127 and 129 is free to move as a unit in the axial direction. At the exhausting end of said tube bundle, a fixed plate 131 acts as the variable area control and ejector nozzle for both controlling the exhaust gas area 133 and ejector function of directing the exhaust gases 115 and bypass flow 117 to mixing region 135. Subsequent to said mixing region the combined flow (bypass flow 117 and exhaust gas flow 115) can be diffused if necessary and then turned by guide vanes 139 prior to entering turbine blades 141. Turbine blades 141 fixed to turbine wheel 143 extract power from said combined flow for powering said compressor. A baffle plate 145 is located between said end portion of tube bundle 123 so as to form control chamber 147. Said tube bundle may be biased by spring 149 and the variation of pressure in said chamber 147 controls the axial position of said tube bundle 123. Part 151 is a multitude of spindles 153 which make up the variable area for controlling the amount of bypass flow in region 155. Holes pass through said member 151 between said spindles 153 so as to allow the bypass flow to enter said tube bundle. As can be seen, when the tube bundle is in the most "left" position the bypass flow area is at a minimum while the engine exhaust gas control area is a maximum. Likewise when said tube bundle 123 is in the most "right" position, the bypass flow is at a maximum while the exhaust gas flow is a minimum. Thus, the bypass flow ratio may be controlled as a function of the chamber pressure in chamber 147 which is suitably controlled and maintained as described previously.

Figure 8A:
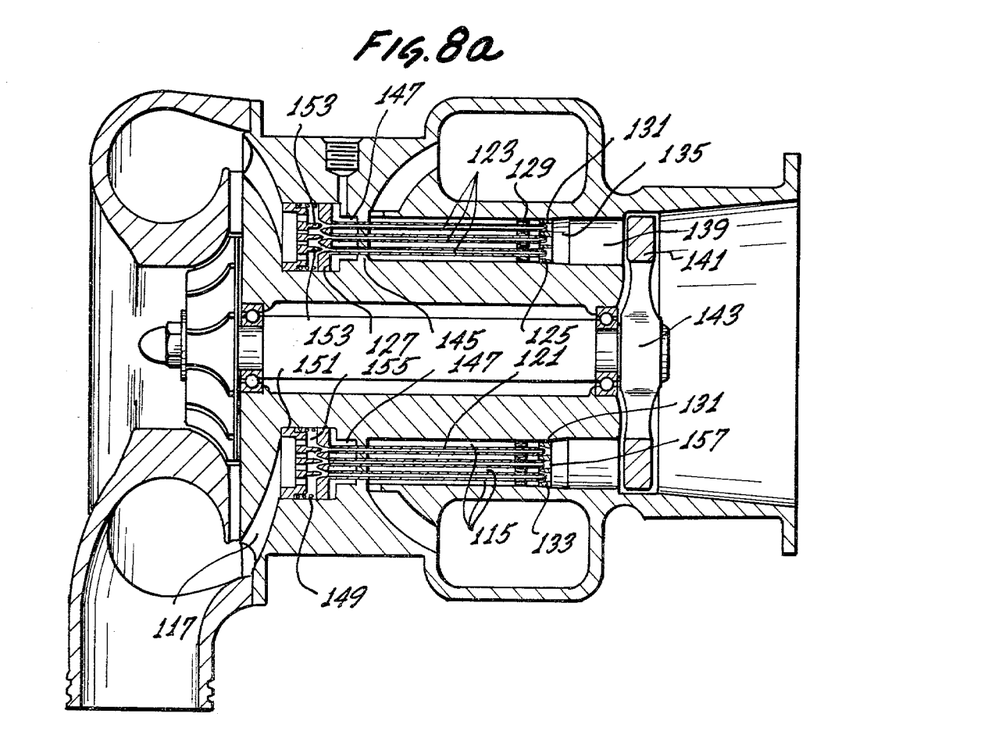
FIG. 8a is a view similar to FIG. 8 illustrating a two flow variable area ejector in accordance with this invention.

FIG. 8a is an illustration of the combination of a heat exchanger and a two flow variable area ejector. It should be noted that the heat exchange portion of the said device may take other forms such as the use of finned tubing or spiral wound tubing with the required manifolding configurations to result in the correct ejector nozzle design. By transferring a portion of the exhaust gases' heat to the bypass flow through said tubes 121, a higher exhaust velocity of the bypass flow will result. This high velocity bypass flow and subsequent mixing of the somewhat cooled exhaust gas flow will produce a higher efficiency in the overall performance of said ejector device since the heat transfer will occur to the bypass flow 117 prior to its expansion through bypass nozzle 157 which is one component of ejector nozzle 125.

Figures 9, 10:
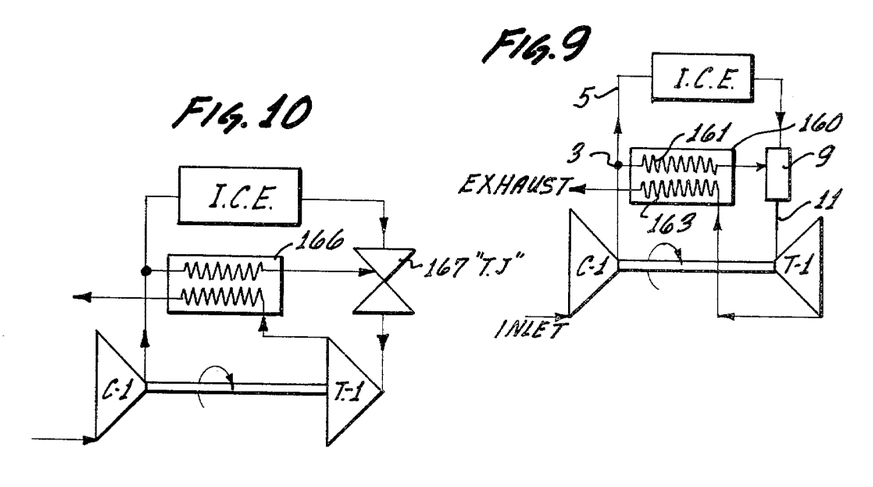
FIG. 9 is a view similar to FIG. 1 and including a regenerative heat exchanger in accordance with this invention.
FIG. 10 is a view similar to FIG. 5 and including a regenerative heat exchanger in accordance with this invention.

FIG. 9 shows a turbocharging scheme which is similar to that as shown and explained in FIG. 1 except in this case a regenerative heat exchange is used to preheat the bypass flow by the residual heat remaining in the discharged gases from the drive turbine. Specifically, by referring to this figure, the bypass compressor flow leaving junction 3 enters regenerative heat exchange 160 and is heated in pass 161 by exhaust gases from turbine T-1 in pass 163. Thus the heated bypass compressor fluid will have more available energy so that upon its mixing with the I.C.E. engine's exhaust gases in ejector 9, a more efficient system will result. This higher efficiency manifests itself by the fact that a lower I.C. engine backpressure is required. Thus, when the I.C. engine's exhaust gas at its lower backpressure, combine with the heated bypass flow in said ejector 9 and is transported to the turbine via pipe 11, it will have enough energy to power said turbine T-1 which drives compressor C-1 (all at a lower pressure level in the I.C. engine exhaust gas than that required for the scheme as described in FIG. 1). The given backpressure requirements can be reduced by a factor of one, i.e. only ½ the total backpressure is required—in effect doubling the efficiency of this overall scheme (Figure as compared to the system described in FIG. 1. The disadvantage of the system as depicted in FIG. 9 is the cost and complexity required by the addition of the regenerator (heat exchange) 160. All of the various detail ejector designs as explained above can be utilized in conjunction with the addition of said regenerator 160. Obviously, slight area changes would be required in said ejector since the bypass flow fluid is hotter and would therefore have slightly different thermodynamic properties which would be relevant to the correct ejector design. As for illustrative purposes, FIG. 10 shows the same scheme as that given in FIG. 5 except that in this system a regenerative heat exchanger 166 is employed prior to the bypass fluid being utilized as the drive fluid in TJ 167, which in turn combines with the I.C. engine exhaust gas prior to the combined gases being utilized to drive turbine T-1. Since in this example, the heated bypass fluid would have more energy than those systems where regenerative heat is not utilized, the I.C. engine would exhaust at a lower backpressure than possible in the non-regenerative cycles. In this mode of operation, during the high power requirements a minimum optimum bypass ration would be utilized, since there always has to be some bypass flow through the regenerator in order to take advantate of the regeneration effect. Thus, in all of the systems employing the regenerative effect there would always be a bypass flow and the overall system would be designed such that this bypass ratio would always be a finite number, i.e. there would always be some bypass flow between all of the I.C. engine's requirements ranging from idle to full power. This range of bypass flow would be optimised as a function of the specific engine's flow characteristics and the required operating power range.

What is claimed is:

1. A turbocharger system for a combustion engine comprising:

a compressor having an ambient air inlet and a compressed air outlet, a turbine having an inlet for driving fluid and an outlet, ejector mixing means having a first and second inlet and an outlet, the outlet of said ejector mixing means being connected to the inlet of said turbine, means connected to receive the compressed air from the outlet of said compressor and for flowing one portion thereof to the combustion engine and another portion thereof to said first inlet of said ejector mixing means, means to flow exhaust gas from the combustion engine to said second inlet of said ejector mixing means, said ejector mixing means including ejector nozzle means cooperating with said first and second inlets whereby the engine exhaust gas is admixed with the other portion of the compressor output in said nozzle means to form a turbine drive fluid which flows out of said ejector mixing means outlet; a said ejector nozzle means being movable with respect to said first and second inlets and including a primary nozzle and a secondary nozzle and wherein the area of one is increased as the area of the other is decreased, and means connecting said turbine to drive said compressor.

2. A turbocharger as set forth in claim 1 wherein said turbocharger includes turbine inlet flow nozzles, said housing including a recessed region, and said nozzles including (recessed) radial type vanes located in said recessed region.

3. A turbocharger as set forth in claim 1, wherein said compressor includes (axial) compressor diffuser vanes arranged axially with respect to the means connecting the turbine to drive said compressor.

4. A turbocharger system as set forth in claim 1 wherein said ejector mixing means includes ejector nozzle means movable with respect to said first and second inlets.

5. A turbocharger system as set forth in claim 1 further including common housing means for said turbine, compressor and ejector means, said ejector means being a flow divider plate supported by said housing and movable between said turbine and compressor, means in said housing forming a mixing region for the exhaust gas and said other portion of said compressor output, and inlet flow nozzles being mounted on said flow divider plate.

6. A turbocharger system as set forth in claim 1 wherein said ejector mixing means is a turboejector including a housing which supports turbine means and ejector means, said housing including inlet means for said turbine means and for said ejector means and an outlet, the outlet of said turboejector being connected to the inlet of said turbine, and said inlet means of said turboejector being connected to receive exhaust flow from said engine and said other portion of the output of said compressor.

7. A turbocharger as set forth in claim 6 further including a heat exchanger, and said heat exchanger being operative to heat at least a portion of the compressor output prior to entry into the turbine.

8. A turbocharger system as set forth in claim 1 further including common housing means for said turbine, compressor and ejector mixing means, said ejector mixing means being supported in said housing between said turbine and said compressor, and said ejector nozzle means being movable between said turbine and compressor.

9. A turbocharger system as set forth in claim 8 wherein said compressor includes a diffuser.

10. A turbocharger as set forth in claim 9 wherein said diffuser is a vaned diffuser.

11. A turbocharger as set forth in claim 9 wherein said diffuser is a vaneless diffuser.

12. A turbocharger as set forth in claim 8 further including means to preheat a portion of the compressor output prior to flow of the same into said turbine.

13. A turbocharger system as set forth in claim 8 wherein said ejector nozzle means is a variable area nozzle and includes a flow divider plate and inlet flow nozzles for directing flow to said turbine.

14. A turbocharger as set forth in claim 8 further including a heat exchanger for receiving a portion of the compressor output to heat the same prior to flow into the turbine.

15. A turbocharger as set forth in claim 14 wherein said heat exchanger is a regenerative heat exchanger in which the turbine exhaust forms the heat source.

16. A turbocharger as set forth in claim 14 wherein said heat exchanger is connected to heat a portion of the compressor output prior to mixture with the engine exhaust.

* * * * *